United States Patent
Hulm et al.

(10) Patent No.: US 9,383,200 B2
(45) Date of Patent: Jul. 5, 2016

(54) OPTOELECTRONIC SENSOR AND METHOD FOR THE DETECTION AND DETERMINATION OF DISTANCES OF OBJECTS

(75) Inventors: Christian Hulm, Waldkirch (DE); Jörg Sigmund, Freiburg (DE); Gerold Feise, Hamburg (DE)

(73) Assignee: SICK AG, Waldkirch (DE)

( * ) Notice: Subject to any disclaimer, the term of this patent is extended or adjusted under 35 U.S.C. 154(b) by 466 days.

(21) Appl. No.: 13/996,238

(22) PCT Filed: Oct. 21, 2011

(86) PCT No.: PCT/EP2011/068446
§ 371 (c)(1),
(2), (4) Date: Jul. 29, 2013

(87) PCT Pub. No.: WO2012/084298
PCT Pub. Date: Jun. 28, 2012

(65) Prior Publication Data
US 2013/0301030 A1    Nov. 14, 2013

(30) Foreign Application Priority Data

Dec. 21, 2010 (DE) .......................... 10 2010 061 382

(51) Int. Cl.
*G01C 3/08* (2006.01)
*G01S 7/481* (2006.01)
(Continued)

(52) U.S. Cl.
CPC . *G01C 3/08* (2013.01); *G01S 7/483* (2013.01); *G01S 7/487* (2013.01); *G01S 7/4817* (2013.01); *G01S 7/4861* (2013.01); *G01S 17/42* (2013.01)

(58) Field of Classification Search
CPC ......... G01S 3/08; G01S 7/4817; G01S 7/483; G01S 7/4861; G01S 7/487; G01S 17/42
See application file for complete search history.

(56) References Cited

U.S. PATENT DOCUMENTS 7,158,217 B2    1/2007 Hoashi et al.
8,315,473 B1 *  11/2012 Tao ........................... G06T 5/20
                                                382/168
(Continued)

FOREIGN PATENT DOCUMENTS

DE          43 40 756 A1      6/1994
DE      10 2007 013 714 A1   10/2008
(Continued)

*Primary Examiner* — Luke Ratcliffe
*Assistant Examiner* — Samantha K Abraham
(74) *Attorney, Agent, or Firm* — Nath, Goldberg & Meyer; Jerald L. Meyer; Stanley N. Protigal

(57) ABSTRACT

A laser scanner (10) detects and determines distances of objects comprises a light transmitter transmitting light in a plurality of consecutive individual pulses. A rotatable deflection unit (18) for the periodical deflection of the transmission light beam (16) into the monitoring zone (20) and an angular measurement unit (30) generates angular position signals (62) in dependence on an angular position of the deflection unit (18). An evaluation unit (32) identifies a received pulse associated with an object from a histogram (110) taken from a histogram memory (32*a*, 32*b*) to determine the distance of the object by means of a light propagation method. The histogram (110) is collected over a time interval which is associated with the angular position signal (62). In this connection at least two histogram memories (32*a*, 32*b*) are provided in order to collect a first histogram and a second histogram in overlapping time intervals.

18 Claims, 8 Drawing Sheets

Figure 1:
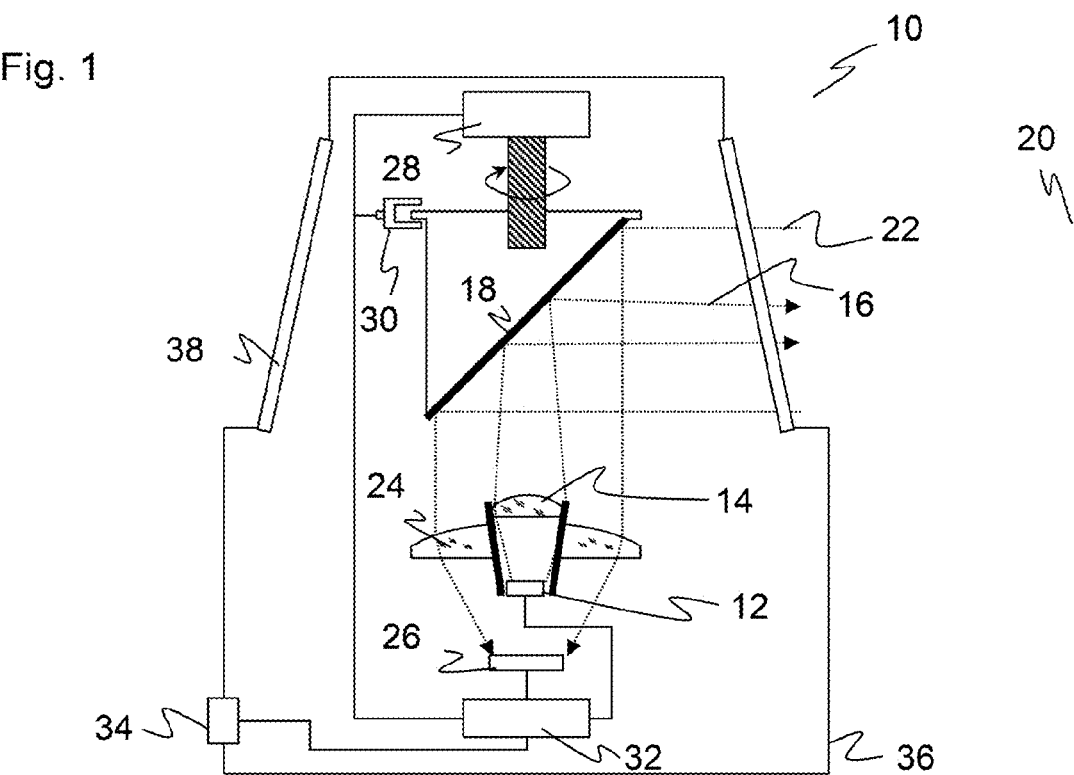

(51) Int. Cl.
*G01S 7/483* (2006.01)
*G01S 7/486* (2006.01)
*G01S 7/487* (2006.01)
*G01S 17/42* (2006.01)

(56) References Cited

U.S. PATENT DOCUMENTS

2004/0169840 A1* 9/2004 Hoashi .................. G01S 7/486 356/4.01
2005/0135824 A1* 6/2005 Shi ...................... G03G 15/0266 399/50
2007/0124094 A1* 5/2007 Brey ...................... G06F 1/3203 702/60
2009/0237499 A1* 9/2009 Kressel .................... F16P 3/14 348/77
2010/0128246 A1 5/2010 Heizmann et al.
2010/0225525 A1 9/2010 Takase et al.
2011/0098970 A1* 4/2011 Hug ...................... G01F 23/284 702/159

FOREIGN PATENT DOCUMENTS

| EP | 1 522 870 A1 | 4/2005 |
| EP | 2 189 805 B1 | 5/2010 |
| EP | 2 189 814 B1 | 5/2010 |
| EP | 2 189 804 B1 | 10/2010 |
| JP | 2010122221 A | 6/2010 |
| JP | 2010203941 A | 9/2010 |

* cited by examiner

OPTOELECTRONIC SENSOR AND METHOD FOR THE DETECTION AND DETERMINATION OF DISTANCES OF OBJECTS

This is a National Phase Application filed under 35 U.S.C. 371 as a national stage of PCT/EP2011/068446, filed Oct. 21, 2011, and claiming the benefit from German Application No. 10 2010 061 382.7, filed Dec. 21, 2010, the content of each of which is hereby incorporated by reference in its entirety.

The invention relates to a laser scanner and to a method for the detection and determination of distances of objects in accordance with the preamble of claim 1 or claim 14 respectively.

Laser scanners are suitable for distance measurements requiring a large horizontal angular region of the measurement system. In a laser scanner a light beam generated by a laser periodically covers a monitoring zone with the aid of a deflection unit. The light is remitted at objects in the monitoring zone and evaluated in the laser scanner. From the angular position of the deflection unit conclusions are drawn on the angular position of the object and from the propagation time conclusions are additionally drawn with respect to the distance of the object from the laser scanner on use of the speed of light.

The position of an object in the monitoring zone is detected in two-dimensional polar coordinates by means of the specification of the angle and distance. In this way the positions of objects can be detected or their contour determined. The third spatial coordinate can likewise be detected, by means of a relative movement in the transverse direction, for example, by a further movement degree of freedom of the deflection unit in the laser scanner or in that the object is conveyed relative to the laser scanner. Thus, also three-dimensional contours can be measured.

Laser scanners are used in the safety technology for the monitoring of a source of danger, such as, for example, is represented by a dangerous machine. Such a safety laser scanner is known from the DE 43 40 756 A1. In this connection a protective field is monitored which is not allowed to be accessed by operating personal during the operation of the machine. If the laser scanner recognizes an unallowed interference in the protective field, for example, a leg of an operating person, then it initiates an emergency stop of the machine. Other interferences in the protective field, for example by static machine parts can be taught as permitted in advance. Frequently warning fields are arranged in front of the protective fields, where interferences initially only lead to a warning in order to prevent the interference in the protective field and in this way to prevent the securing in the nick of time and so to increase the availability of the plant. Safety laser scanners typically work on a pulse basis.

Sensors used in the safety technology must work particularly reliable and for this reason satisfy high safety demands, for example, the norm EN13849 for machine safety and the device norm IEC61496 or EN61496 for contactless acting protective devices (BWS). For satisfying these safety norms a series of measures have to be taken, such as secure electronic evaluation by redundant, diverse electronics, functional monitoring or specific monitoring of the contamination of optical components, in particular a front screen and/or the provision of individual test targets with defined degrees of reflection which have to be recognized at the corresponding scanning angles.

Two general principles are known to determine the light propagation time for common laser scanners. The continuous transmission light is modulated and the phase shift of the received signal is evaluated with respect to the transmitted light for phase-based methods. The transmitter works in a single pulse mode of operation with comparatively high pulse energies and the laser scanner measures object spacings by means of the propagation time between the transmission and reception of an individual light pulse for pulse-based methods or pulse propagation methods.

It is disadvantageous with respect to the pulse propagation time method that generally a large transmission power and a very sensitive receiver must be available in order to achieve significant measurement ranges. Particularly at the receiver side the spatial demand and manufacturing costs increase in this connection, for example, for an avalanche photodiode including high voltage generation. A phase-based method with modulations of a continuous wave laser or a CW laser in turn brings about the disadvantage that it only offers a limited region of uniqueness of typically a few meters. At the same time the optical output power of the transmitter in this method is typically so small such that, in particular for additional outer influences, a small signal-to-noise ratio exists. The method has a low ambient light strength and a strongly limited dynamic region.

It is known from one-dimensional distance scanners to determine the light propagation time by averaging a plurality of individual measurements. Such a method is described in the EP 1 522 870 A1. In this respect the use in a scanner is also suggested and in this connection it is noted that a higher averaging depth can be achieved by a slower rotary movement, this means a lower scanning frequency. Apart from this final remark, however, no other insight can be taken from this document with respect to how a resolved angular distance measurement can be determined from individual measurements.

A particularly efficient and exact method of averaging for a one-dimensional distance scanner is presented in the DE 10 2007 013 714 A1. In this connection a plurality of individual measurements are transformed into a bipolar signal by an analog preprocessing are subsequently binarized and thus collected in a histogram. From the histogram the light propagation time is then determined. The EP 2 189 805, EP 2 189 804 and EP 2 189 814 are based on this method and mentioned the applicability at a scanning system, however, without making reference to the practical implementation.

One of the most important characteristics of a laser scanner is the tangential resolution or the angular resolution beside the range. It provides which minimum object size the laser scanner still recognizes as an object having a certain degree of reflection, alternatively, how well the laser scanner resolves a structured contour and how many scanning points have to be output over an angular range.

For a safety laser scanner this angular resolution is finally also standardized. In accordance with IEC 61496-3, for example, a round object having at least 2% remission and a predefined diameter of, for example, 70 mm, 50 mm or 30 mm has to be safely recognized. Depending on the desired range and in this way the extent of the monitored protective fields an angular resolution of 0.5° or less is required to recognize an object with the mentioned diameters.

For common safety laser scanners a deterministic single pulse method is used. This means that the distance to an object is determined by a single transmitted laser pulse. In order to achieve the required tangential resolution capacity the individual laser pulses are transmitted with a certain pulse repetition frequency, such that, for example, precisely one individual pulse is incident per angular segment of 0.5 or 0.25°.

In this connection, it can happen that an object having a minimum detectable size is arranged displaced with respect to this angular grid. Then only a part of the light spot is incident at the object. The remaining part is not remitted and the corresponding transmission energy is lost for the detection of the object and the determination of its spacing. In order to still ensure the safe detection, a safety factor has to be provided for this reason at the ratio of angular resolution to minimum object diameter to be detected. This has the effect that the angular resolution is selected two to three times finer than the tangential dimension of the minimum object to be detected. The energy incident at the object is thus not ideally used. Either the object is over-scanned, since a plurality of transmission pulses are directly incident at the object and in this manner already one of these exact hits would have been sufficient, or energy of part hits remains unused, since it is not sufficient for a secure detection precisely of weakly remitted lines.

For this reason it is the object of the invention to provide a laser scanner having an improved exploitation of the transmission energy.

This object is satisfied by a laser scanner in accordance with claim 1 and by a method for the detection and determination of distances in accordance with claim 14. In this connection the invention starts from averaging methods known from the state of the art mentioned in the introduction which form a third class of light propagation measurement methods as multi-pulse methods besides individual pulse propagation methods and phase-based methods. The received signals respectively associated with a transmitted individual pulse are collected in memory spaces of a histogram memory, i.e. the bin of a histogram. For this purpose, a value is associated for each of the sections of the histograms per bin. For example, the bin width corresponds to the sampling rate and the respective scanning value is accumulated, or a mean value of the associated section of the received signal is formed for larger bin width. Following a sufficient number of individual pulses, the histogram is evaluated. The provision of each measurement value is thus initially limited by the time required to achieve the required number of individual pulses. For this reason at least one additional histogram memory is provided in order to collect a first and a second histogram in overlapping time intervals.

The invention has the advantage that through the implementation of further histogram memories and a corresponding evaluation practically the complete energy incident at an object or a test rod is used. In this connection one can manage without a change of the rotary frequency of the deflection unit or the pulse repetition rate of the light transmitter. Merely the additional memory space and the adapted logic for the evaluation has to be provided. The thereby obtained gain in signal can then be used, depending on the application, for improvements of one or more different parameters; an increase of the range, an improvement of the angular resolution, a reduction of the reaction time, a reduction of the optical systems, a reduction of the pulse repetition rate or a reduction of the light transmission power. The last two mentioned improvements, amongst other things, permit additional leeway with respect to eye protection and an increase of the lifetime of the light source.

In accordance with the invention measurement values are more frequently available. This simplifies the dealings with partial hits, since in one of the other histogram memories, the equivalent to a complete hit is practically available shortly before or shortly after a partial hit. The higher number of measurement values also permits an increased angular resolution and in this way, for example, in applications of navigation, a finer map of the surroundings or in contour measurements a larger attention to detail.

Furthermore, the application of pulse averaging methods in the safety technology are enabled or at least improved by the invention. This allows the manufacture of particularly cost-effective and small sensors having a large horizontal viewing region or angular range. Such a multi-phase method has a significantly larger range of uniqueness and a significantly smaller susceptibility to interference, since also for very adverse signal-to-noise ratios of the individual measurement precise measurements are still possible due to the statistical evaluation. Moreover, on use of a multi-pulse method in a scanning system advantages arise which are not relevant for a simple single beam scanner. In contrast to the known pulse propagation methods a quasi-continuous, this means nearly gap-free scanning of the overall angular range is possible, and a series of adaption possibilities are then made available. In this manner specific measurement requirements can be satisfied.

The evaluation unit is preferably configured for a determination and output of object distances in real time. In this way, a scanning value is practically immediately available, for example, always as soon as the deflection unit is rotated further to the next angular section in accordance with the angular resolution.

The rotation of the deflection unit is preferably divided into angular sections predefined by an angular resolution of the laser scanner, wherein a first time window for collecting a histogram and a thereupon consecutive second time window for evaluating the histogram are provided in the evaluation unit for each angular section. The evaluation of a histogram requires an evaluation time, which can correspond to the time for the transmission of a plurality of individual pulses. For this reason each angular step can be split into two phases, wherein initially the histogram is collected and subsequently evaluated and in this way the measurement value is provided.

This is thus an overlapping of the histograms which overlapping is enabled by the plurality of histogram memories and whose evaluation has to be separated. In an alternative the evaluation unit consecutively accesses the histograms of the histogram memory in shifted evaluation intervals and from this generates a measurement value. For a real time evaluation this presupposes that the calculation capacity of the evaluation unit is sufficient in order to process the consecutively arranged evaluation time windows for all histogram memories without time delay, before a histogram is overwritten in one of the histogram memories by a new histogram.

In an advantageous embodiment the evaluation unit has at least two evaluation channels in which histograms can respectively be evaluated from one of the histogram memories. In this way, the time windows for the accumulation of histograms can then not only be disentangled due to the plurality of histogram memories, but also the evaluation time windows can be disentangled. The evaluation channels thus access different or identical histograms independent from one another and evaluate these next to one another. In particular, the unique associations of histogram memories and evaluation channels can respectively arise. Then received pulses are finally collected in each of the evaluation channels in an own histogram and the propagation time from the laser scanner to an object and therefrom a measurement value of the object distance is respectively determined from the histogram.

The evaluation in the histogram memories and/or in the evaluation channels can completely overlap. This then leads to a redundant measurement for the covering of hardware errors. At the same time, however, also the freedom arises to process histograms in the evaluation channels overlapping with respect to one another in a shifted manner. This can, on the one hand, serve a diverse redundant evaluation. In this connection the evaluation channels remain independent from one another, however, have a different angular grid, such that in summation a higher robustness is achieved than for a pure redundancy. On the other hand, however, also problems with respect to changes of the rotary speed can be solved in this manner and additional measurement information can be gained. A further embodiment evaluates individual light pulses of small transmission power in an evaluation channel and in the other evaluation channel alternatively transmitted individual light pulses of high transmission power are evaluated.

The histogram memory and/or the evaluation channels can, however, also be configured for an overlapping which is only present for deviations in rotation and for which the histograms principally directly follow one another. However, if a histogram has not yet been filled due to a deviation in rotation at the end of an angular segment the accumulation of a new histogram starts in a different histogram memory in an overlapping manner. In this way, a gap-free scanning is achieved also for deviations in rotation.

The criteria according to which histograms are collected in a histogram memory can differ from one another not only with respect to a mutual time shift. For example, a histogram memory can collect a few received signals over very small angular ranges, in contrast to this, the other can collect a plurality of events. In this way, measurement values having a small range and a high angular resolution and also measurement values having a large range and lesser angular resolution are both made available by the same physical measurement. This is only an example for different evaluations. Evaluation channels in a different embodiment can work with a mutual displacement in which groups having a like predefined number of received pulses can be formed, wherein the one evaluation channel, however, respectively starts the group with the angular position signal and the other evaluation channel starts its group with equally distributed spacings between two angular position signals. Thereby, a type of sliding average having a multiplication in resolution corresponding to the number of histogram memories or evaluation channels arises.

The histogram memory is preferably configured to store a time stamp for each accumulated section of a received signal and to respectively delete the oldest received signal on addition of a further received signal in a rolling manner. In this way a histogram arises which at each point in time includes the youngest events, so that practically a measurement value can be derived from each transmitted individual pulse. However, results cannot be simply accumulated in a histogram for this purpose. In this way, a timely sequence would be lost, so that the deletion of the respectively oldest event would be impossible. In contrast to this, a list of the individual contributions having a time stamp must be recorded in each bin, or all younger received signals are stored in order to respectively remove the oldest of the stored received signals from the stored received signals of the histogram.

The evaluation unit is preferably configured to combine histograms of a plurality of histogram memories in a histogram memory. For example, evaluations already take place in very fine angular steps of 0.1°. This is not yet sufficient for a secure detection, since the energy for the specified case of a smallest target with bad remission would not be sufficient. Nevertheless, such measurement values can still be useful. In order to obtain secure measurement values, for example, five such histograms are then combined in order to obtain a secure measurement value after 0.5°.

Preferably at least one analog-to-digital converter is provided in order to digitize received signals for the accumulation in the histogram memories. In this way the evaluation can take place at a digital logic module. In a particularly preferred embodiment the analog-to-digital converter is a binarizer and the memory places are configured as counters. This enables a particularly simple implementation.

The histogram memory, the evaluation unit and the analog-to-digital converter are preferably implemented on a common digital logical module, in particular an FPGA. This leads to very small manufacturing costs since merely the FPGA must be correspondingly programmed.

Advantageously, an analog preprocessor is provided which has a filter in order to respectively transform the received pulse to a bipolar preprocessed signal and to guide this to the evaluation unit via an analog-to-digital converter. Light signals are always unipolar, since incident light can only generate a positive signal in the light receiver. Through a downstream filter, which is displaced into an oscillation by the introduction of light, for example, a band pass filter or a differentiating member, a bipolar signal arises in which a received point in time can be determined by means of a zero crossing by digital signal processing following the analog-to-digital conversion. This is significantly more precise than the determination of the position of, for example, a positive peak, since the zero crossing does not depend on the signal strength and in this way from transmission parameters and environmental parameters. An amplifier, in particular a trans-impedance amplifier, is preferably arranged upstream or downstream of the filter. Moreover, the analog preprocessor particularly preferably comprises a limiting amplifier for the amplification of the positive and/or negative portion of the signal up to a saturation value, wherein the analog-to-digital converter is a binarizer. Thus a binary received signal is formed which permits a particularly resource-saving statistical evaluation. The laser scanner is preferably configured as a safety scanner having a secure output, wherein the evaluation unit is configured to recognize unallowed interactions in protective fields within the monitoring zone and thereupon to output a safety-directed turn-off signal at the secure output. Through the additional histogram memory a pulse averaging method can also be used for the secure recognition of small, remission-weak objects for an as low as possible transmission power.

The suitable combination of received signals associated with individual pulses to be transmitted to histograms is interfered with in real applications, which violate the assumption of a regular association of events with respect to angles. Interferences are, for example, deviations in number of rotations brought about by tolerances of the drive or by impacts, particularly for mobile applications of the laser scanner, such as for contactless transport systems or for driving assistance. In order to thus achieve a quasi-continuous scanning having the desired angular resolution it is helpful to select an intelligent association of events with respect to certain detection angles and in this way to ensure a robustness.

For this purpose the angular measurement unit preferably provides angular position signals at a predefined angular resolution as a basis. The angular resolution can directly correspond to the equidistant uniform incremental coding of an angular dimensional scale. A different uniform angular resolution or an angular resolution differing in different detection directions can be calculated from measured angular positions actually measured in this way, however, also by interpolation or extrapolation.

The angular position signal physically determined in the angular measurement unit or calculated from its signal is used as a kind of angular trigger, which trigger starts the recording of a histogram in the simplest case. However, a different association can also alternatively take place subsequently in which, for example, the angular position signal lies at the end or at another position within the group of received pulses.

The evaluation unit is preferably configured to respectively collect a predefined number of received signals in a histogram with respect to an angular position signal. The number is the same in an embodiment for all angular position signals so that a histogram having the same number of measurement repetitions is thus formed for each detection angle. In this connection, it is not necessarily required that the received signals of a group directly follow one another; thus, for example, received pulses can be alternatively allocated to different histograms. This can then be used to alternatively transmit individual light pulses with high and low power. Thereby one obtains a measurement value from a scanning with high power for targets of low remission and one obtains a measurement value from a scanning with low power for a strongly remitting target, such as a reflector, which avoids saturation or over-modulation. Preferably, the timely spacing between two individual light pulses is constant, the light transmitter thus works with a constant repetition frequency. Alternatively, the individual light pulses are provided with individual offsets in time, so that they only achieve a constant repetition frequency on average in order to smudge the scanning at the time beam and to reduce artifacts by a discrete grid.

The number of individual pulses, as well as the timely spacing between two respective individual pulses is preferably small enough in order to leave a time buffer between the respective last received signal of a histogram and the subsequent angular position signal. Thus, a smaller number of received pulses is evaluated than that which would actually be possible for an ideal utilization of a time budget between two angular position signals. Thereby, deviations of the rotary movement are caught and it is ensured that the group of received pulses is complete for the subsequent angular position signal. Preferably, only so many individual light pulses are generated as are evaluated with respect to an angular position signal as then transmission pauses during a time buffer result. Alternatively, individual light pulses are continuously transmitted, but are not evaluated during the time buffer.

As an alternative to a time buffer a histogram is terminated for each new angular position signal and a new histogram is started. Then, the number of received signals is different in the group, amongst other things, in particular for changes of the rotational speed. This leads to a different statistical depth and in this way to a deviation in range of the detection angle.

The evaluation unit is preferably configured to check whether a further angular position signal is present in the space of time in which the predefined number of received signals is detected and in this case to associate the measurement value determined for the object spacing from the histogram with that angular position signal to which the majority of received signals belong, in particular to associate the measurement value with that angular position time signal for which the added time spacings with respect to the received signals of that histogram are lowest. Hereby, no time buffer is charged and in this way the maximum measurement information is detected with a highest possible number of individual measurements per rotation of the deflection unit. In order to still avoid deviations in range for different detection angles, the predefined number of received signals is collected in a histogram even then when a further angular position signal lies therebetween, which further angular position signal actually requires the start of the detection of a new histogram for the next measurement value. Subsequently, the measurement value is associated to that angular position signal which best represents the angular association of the histogram. As long as the rotational speed behaves as provided, the time intervals between two angular position signals and the predefined number are preferably matched to one another so that this subsequent association is omitted. Otherwise, it can also happen that a measurement value is already associated with the next but one angular position signal by a continued delay of the collection of the predefined number. For one such excluded angular position signal a measurement value can then be interpolated.

The evaluation unit is preferably configured to carry out the selection of received signals to a histogram in a time-delayed manner. In this way only a slightly time-delayed quasi real time evaluation of the measurement is achieved, for example, delayed by one or half a scanning period. For typical rotation frequencies of the deflection unit, however, only a few fractions of a second are lost with respect to a real time evaluation in this connection. For this reason arbitrary and adaptable histogram distribution are subsequently possible. The received signals should carry a kind of time stamp or angular stamp for this purpose, such as discussed above with respect to the rolling histogram, such that subsequently an association of a received signal with an angular position still remains possible.

The evaluation unit is preferably configured to match the number of received signals in a histogram in dependence on the detection angle and/or in dependence on a previously determined object spacing. Different statistical depths of the histograms have the practical effect of a different range and angular resolution. For a dependency on the detection angle, angular regions with higher range for lower angular resolution are formed in this manner and vice versa, such that after application a respective higher flexibility is given. An adaptive dependency of the histogram association by means of a previously determined object spacing, for example, serves the purpose of scanning the initially empty monitoring zone with a high range and lesser angular resolution then, however, for already detected objects generally or in an angular environment of this detection angle to reduce the range in order to achieve a larger angular resolution.

The laser scanner preferably has a parameterizing unit in order to set a higher angular resolution for a smaller range of the sensor or vice versa. The parameterization unit can be configured as an operating field at the laser scanner or as a connection for a data connection. Through the additional capability of being parameterized a higher flexibility for requirements of the specific application arise. The setting is implemented by a changed histogram association which histogram collects received signals depending on the parameterization by increasing or reducing the range over a smaller or larger angular region.

The histogram is preferably pre-loaded with expectation values already before the collection of the received pulses, wherein in particular the expectation values are dependent on the detection angle. In this way, an expectation is then imaged which then modifies the measurement result.

The expectation values are preferably determined from a calibration measurement in a reference state of the monitoring zone. The expectation values are thus obtained by an initial measurement. The deletions are then preferably pre-stored rather than the reference values themselves, possibly after averaging over a larger number of calibration measurements or different preprocessing. A measurement then automatically balances out the expectations before the measurement values actually have an impact. As an example the pre-loading of a front screen reflex should be mentioned. In this connection this is a portion of the received signal arising from a reflection of the individual pulses at the front screen already in the interior of the sensor and interferes with the measurement. The typical form of the front screen reflex can then be measured in advance and be pre-stored in the histogram so that the arising histograms are freed of this interference. A different example is the pre-storing of a reference scenario. The sensor then only registers dynamic changes of a known object arrangement. In contrast to a preloading of the front screen reflex, which generally affects to all histograms in the same manner, the histograms are preloaded differently independent of their angle for a reference scenario.

The method in accordance with the invention can be furthered in a similar manner by further features and in this respect shows similar advantages. Such further features are described by way of example, but not conclusively, in the dependent claims adjoining the independent claim.

Figure 2:
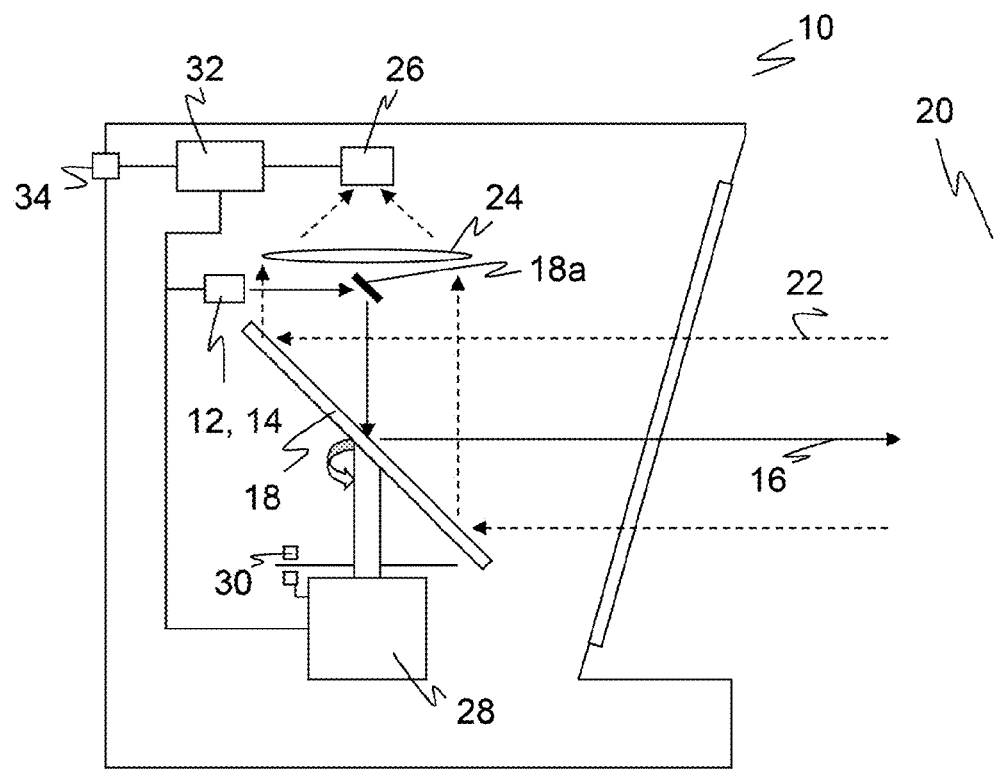
Figure 3:
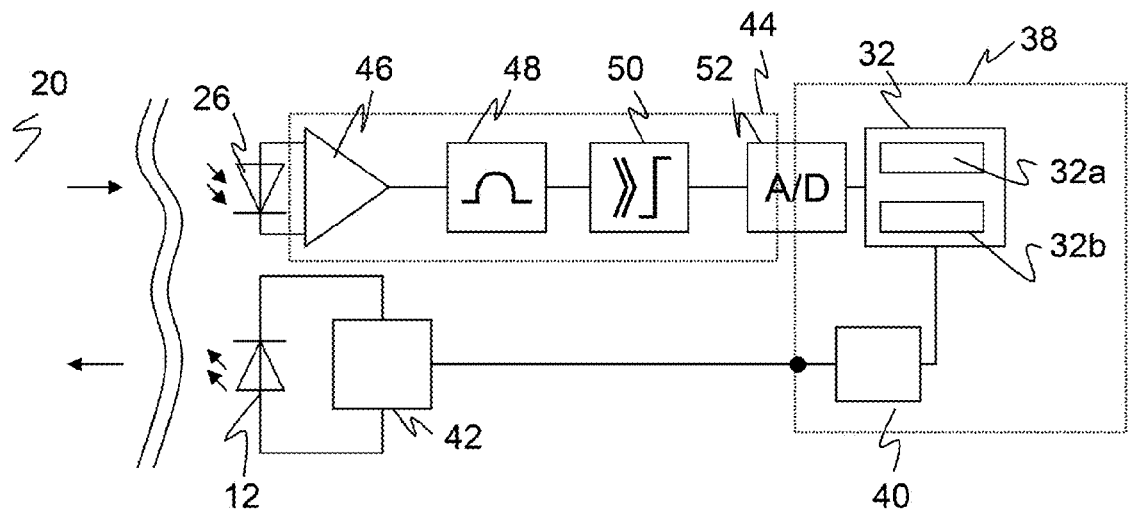
Figure 4:
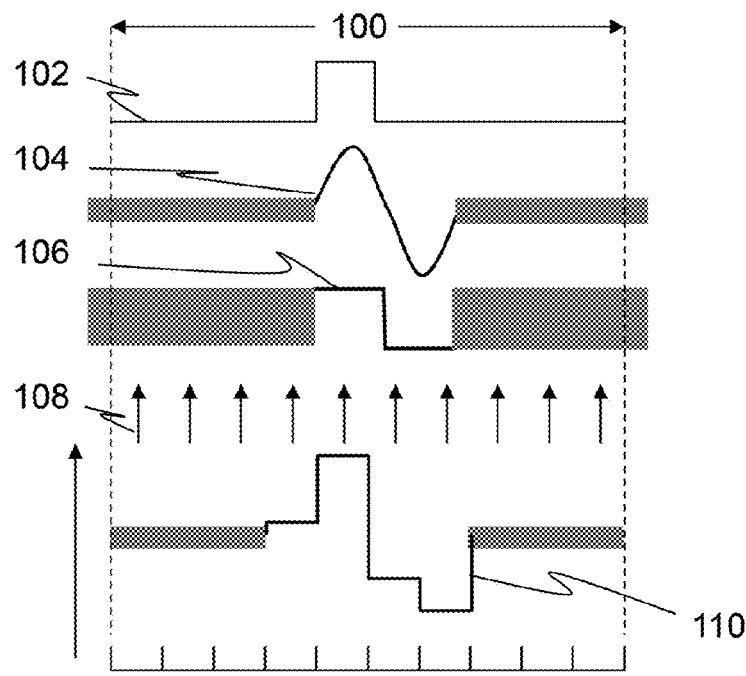
Figure 5A:
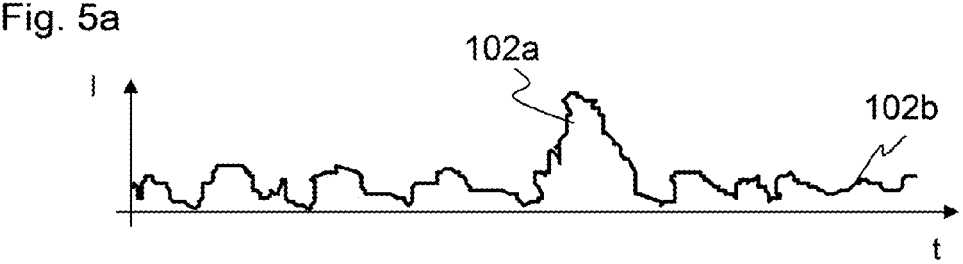
Figure 5B:
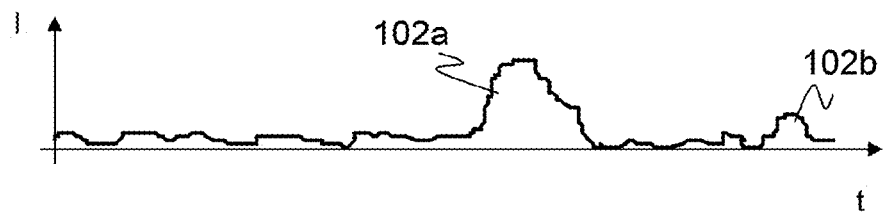
Figure 6A:
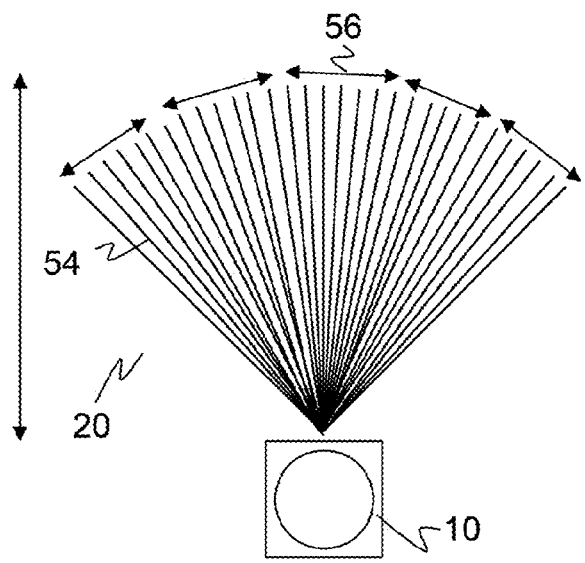
Figure 6B:
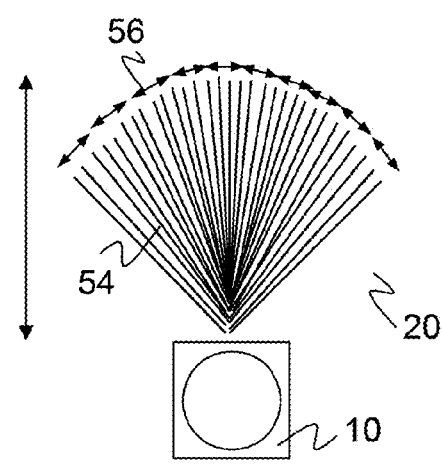
Figure 7A:
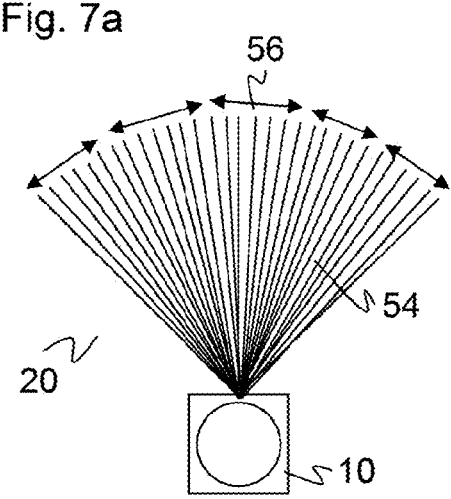
Figure 7B:
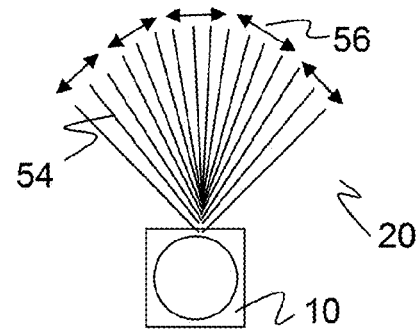
Figure 7C:
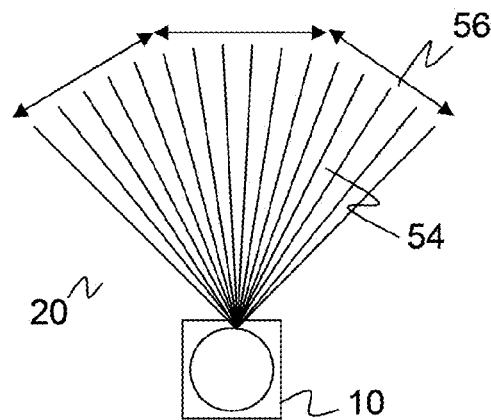
Figure 8A:
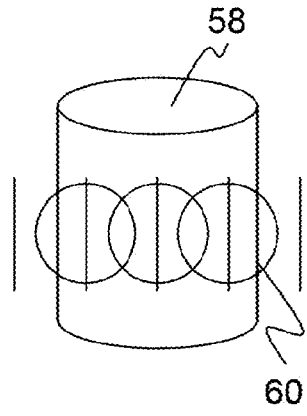
Figure 8B:
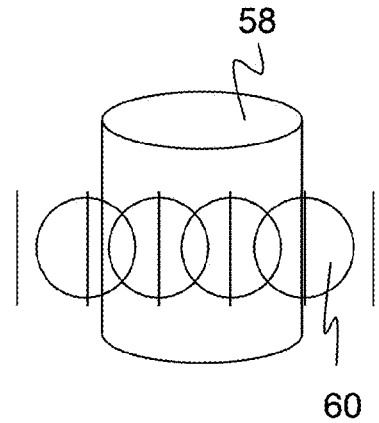
Figure 9:
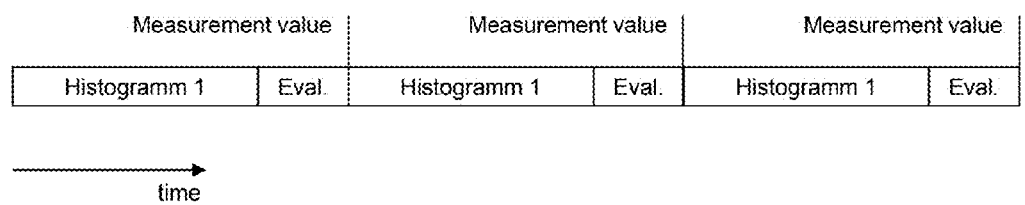
Figure 10:
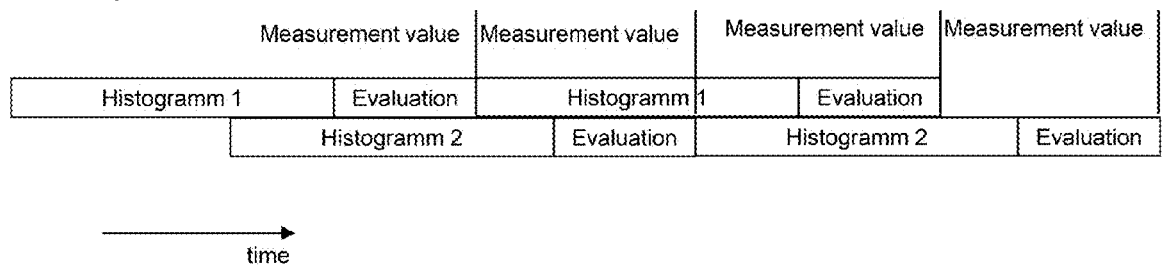
Figure 11:
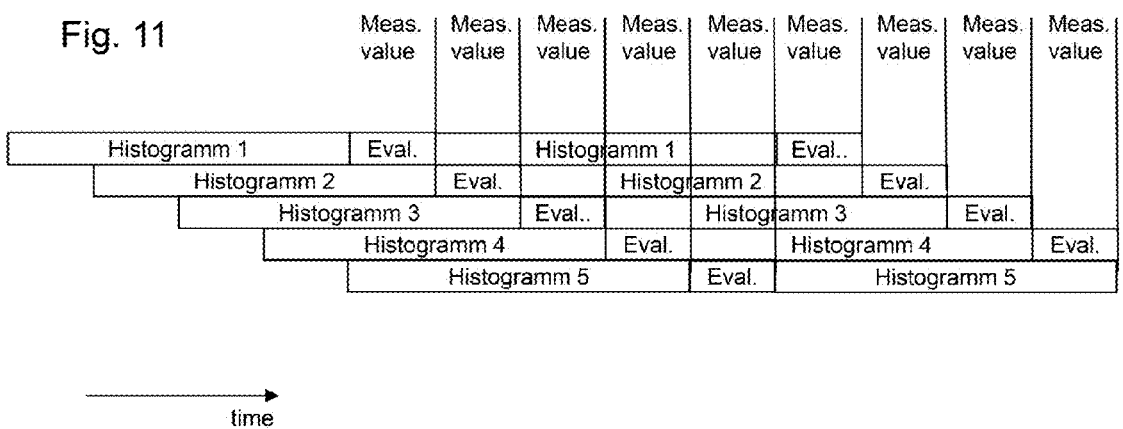
Figure 13:
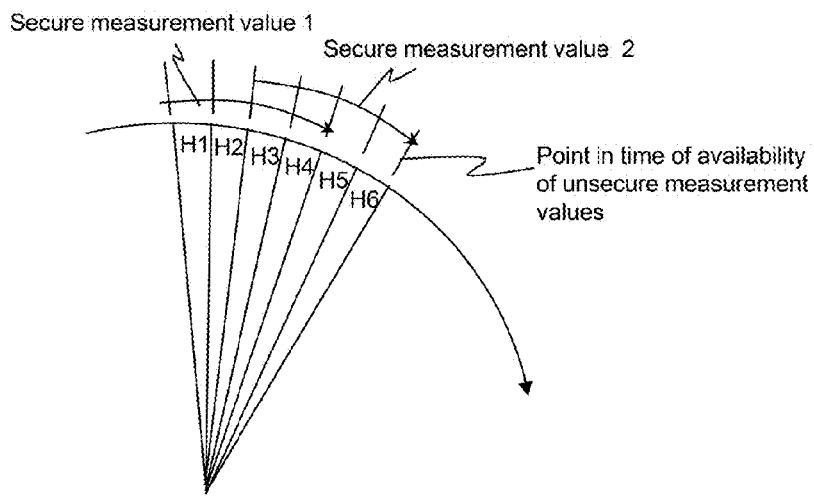
Figure 14A:
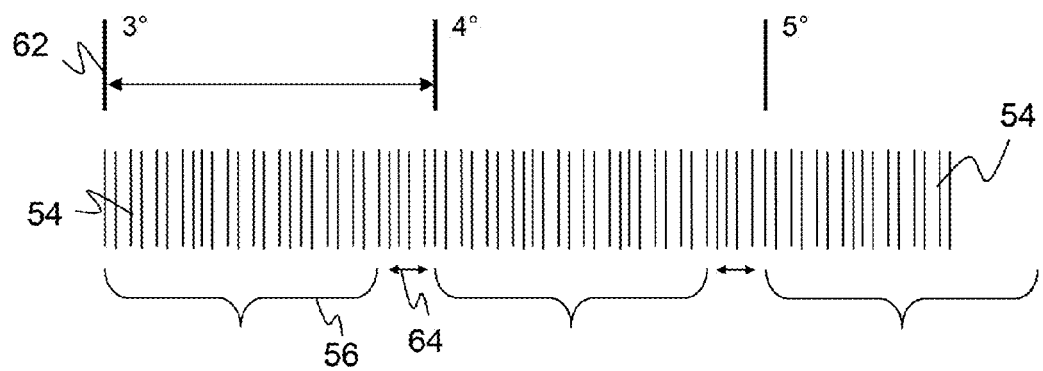
Figure 14B:
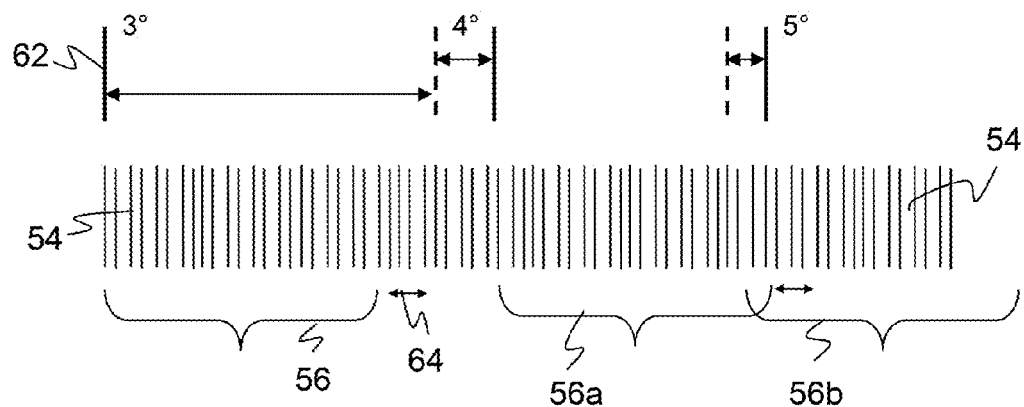
Figure 15:
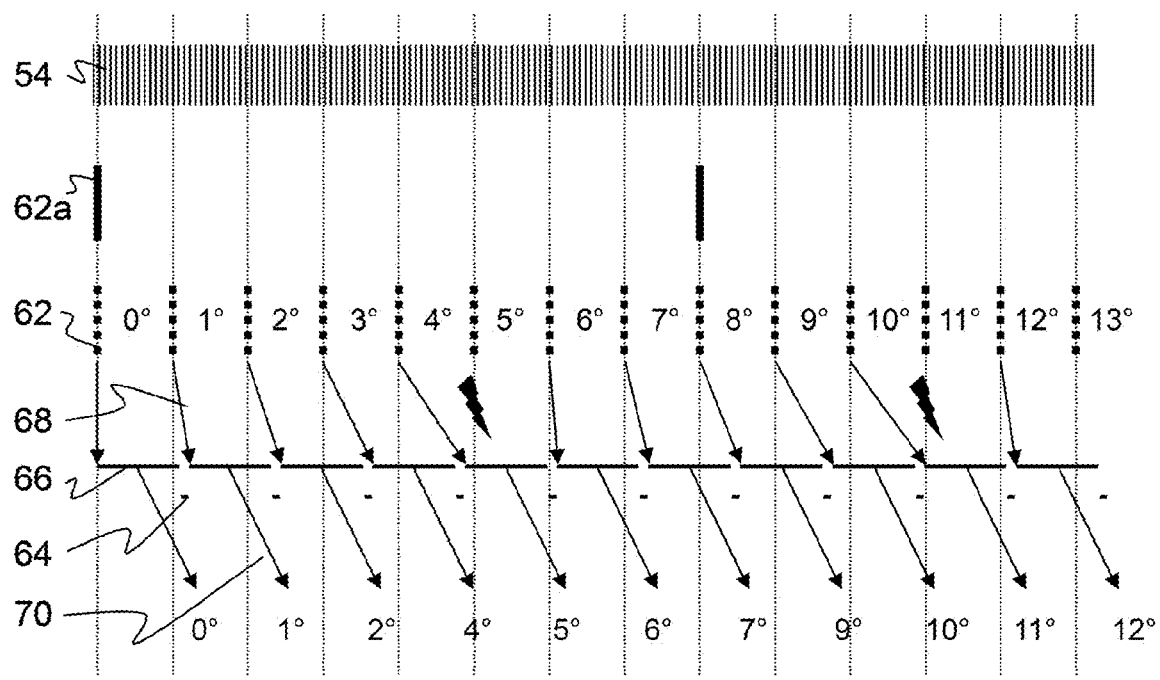

The invention will be described in the following also with respect to further advantages and features with reference to the submitted drawings by means of embodiments. The Figures of the drawing show in:

FIG. 1 a schematic sectional illustration through a laser scanner;

FIG. 2 a schematic sectional illustration through a different embodiment of a laser scanner;

FIG. 3 a block illustration of an analog signal pre-processing and a digital evaluation of the laser scanner in accordance with FIG. 1 or FIG. 2;

FIG. 4 an illustration of the signals in different processing steps of the preprocessing and evaluation in accordance with FIG. 3;

FIG. 5a a purely exemplary timely intensity extent of a received signal recorded at a light receiver of a laser scanner for a small averaging depth and thus range;

FIG. 5b an intensity extent similar to that of FIG. 5a for a high averaging depth and thus range;

FIG. 6a a schematic top view onto the angular distribution of the individual light pulses of a laser scanner for a high range and low angular resolution;

FIG. 6b an illustration similar to that of FIG. 6a for low range and high angular resolution;

FIG. 7a a schematic top view onto the angular distribution of the individual light pulses of a laser scanner as a comparison image;

FIG. 7b an illustration similar to that of FIG. 7a for increased scanning frequency and for this region reduced range;

FIG. 7c an illustration similar to that of FIG. 7a for increased scanning frequency and an angular resolution reduced instead of the range;

FIG. 8a a schematic illustration of scanning beams at a test object in a first configuration having only one complete hit;

FIG. 8b a schematic illustration of scanning beams incident at a test object slightly displaced with respect to FIG. 8a having two complete hits;

FIG. 9 a schematic illustration of the timely extent on the measurement value detection using only one histogram memory;

FIG. 10 a schematic illustration similar to that of FIG. 9 on the measurement value detection using two histogram memories;

FIG. 11 a schematic illustration similar to that of the FIGS. 9 and 10 for the measurement value detection using a plurality, of histogram memories, for example five histogram memories;

FIG. 12a-d a schematic illustration of the timely sequence of histograms in which respectively a currently detected received signal replaces the oldest previously detected received signal;

FIG. 13 a schematic illustration of angular regions which are associated with histograms for highly resolved detection of non-secure measurement values and therefrom for the combined detection of secure measurement values;

FIG. 14a a placing on top of one another in time of angular position signals, individual light pulses and their grouping for regular rotation of the deflection unit;

FIG. 14b an illustration similar to that of FIG. 14a for a deviation of number of rotation; and FIG. 15 a placing on top of one another in time of the individual pulses, the signals of an angular measurement unit, the angular position signals derived therefrom and angular segments, as well as a dynamic association of groups of individual light pulses to angular segments.

FIG. 1 shows a schematic sectional illustration through a laser scanner 10. A light transmitter 12, for example, having a laser light source, generates a transmission light beam 16 with the aid of a transmission optical system 14. The transmission light beam 16 is transmitted into a monitoring zone 20 by means of a deflection unit 18 and is remitted from there by a possibly present object. The remitted light 22 arrives back at the laser scanner 10 and is detected there by a light receiver 26 via the deflection unit 18 by means of a received optical system 24. The light receiver being, for example, a photodiode or an avalanche photodiode (APD) for higher sensitivity.

The deflection unit 18 is displaced into a continuous rotary movement with a scanning frequency by a motor 28. Thereby, the transmission light beam 16 scans a plane during each scanning period, this means during a complete rotation at the scanning frequency. At the outer circumference of the deflection unit 18 an angular measurement unit 30 is arranged in order to detect the respective angular position of the deflection unit 18. The angular measurement unit 30 is formed in this example by way of example as a dotted disc as a dimensional scale and a forked light barrier as a scanner.

An evaluation unit 32 is connected to the light transmitter 12, the light receiver 26, the motor 28 and the angular measurement unit 30. In a multi-pulse method, to be explained in the following with reference to the FIGS. 3 and 4 in more detail, the light propagation time is measured between the transmission of the transmission light beam 16 and the reception of remitted light 22 in order to draw a conclusion on the distance of a scanned object from the laser scanner 10 by using the speed of light. The respective angular position, at which the transmission light 16 was transmitted, in this connection is known to the evaluation unit from the angular measurement unit 30. In this connection, the light propagation times are negligible with respect to typical rotary frequencies of the deflection unit 18, so that the transmission light beam 16 is practically transmitted at the same angle as the associated remitted light 22 is received.

Thus, two-dimensional polar coordinates of all object points in the monitoring zone 20 are available after each scanning period via the angle and the spacing. In this way the object positions and/or object contours are known and can be transferred via an interface 34 or displaced at the laser scanner 10. The interface 34 in turn also serves as a parameterization interface via which data can be input to the evaluation unit 32. Alternatively, an own parameterization interface can be provided. For applications in the safety technology the interface 34 can be configured secure, in particular as a secure output (OSSD, Output Signal Switching Device) for a safety-directed turn off signal on recognition of a violation of a protective field. The laser scanner 10 is accommodated in a housing 36 which has a surrounding front screen 38.

The light transmitter 12 and its transmission optical system 14 is present at the illustrated laser scanner 10 in a central opening of the received optical system 24. This is only an exemplary possibility of the arrangement. The invention also comprises alternative solutions, for example having an own mirror region for the transmission light beam 16 or with dividing mirrors. Also the geometry of the housing 36 and the front screen 38 are to be understood purely by way of example.

FIG. 2 shows an alternative embodiment of the laser scanner 10. In this connection, the same reference numerals refer to the same features or features corresponding to one another. The principle of function is generally the same as for the laser scanner 10 in accordance with FIG. 1. Differences are present in the transmission path which is folded behind the light transmitter 12 with the aid of an additional deflection unit 18a and only has one transmission optical system 14 integrated in the light transmitter 12 having the design of the reception optical system 24 and in the form of the housing 36 and the front screen 38. These variations should now only illustrate examples of the different possibilities of configuring a laser scanner 10.

In safety technological applications the evaluation unit 32, which simultaneously takes on the control functions in the laser scanner 10 then configured as a safety laser scanner monitors protective fields within the monitoring zone 20 on unallowed object interaction. The geometries of the protective fields can, for example, be determined by a graphical configuration. If a safety-critical interaction is recognized then the evaluation unit 32 outputs a safety signal to a monitored source of danger, for example a machine, via the safety output 34.

The propagation time measurement takes place in a multi-pulse method which will now be explained with reference to FIGS. 3 and 4 in detail. The multi-pulse method is known for one-dimensional distance scanners from the initially mentioned DE 10 2007 013 714 and reference is made to this for additional explanations.

The evaluation unit 32, in this example having two histogram memories and/or evaluation channels 32a-b is implemented by way of example at a digital module 38, for example an FPGA (Field Programmable Gate Array). The evaluation unit 32 initiates the transmission of individual light pulses at clearly defined points in time at a transmission path via a delay unit 40 and a laser drive circuit 42. The delay unit 40 can be realized by registers, counters and the like of the FPGA.

The remitted light 22 of an individual pulse is transformed into a received pulse by the light receiver 26 and is supplied to the evaluation unit via an analog pre-processor 44 having a preamplifier 46, a filter 48 and a limiting amplifier 50, as well as via an analog-to-digital converter 52. The preamplifier 46 and the filter 48 can also be arranged exchanged in their position.

In this connection, the signals arising in the different intermediate steps are shown in FIG. 4. The light transmitter 12 generates an individual light pulse in each measurement period 100 which individual light pulse enables the determination of a precise point in time. A rectangular pulse is suitable for this purpose, however, also other pulses are plausible, for example Gaussian pulses. The individual light pulse is reflected or remitted in the monitoring zone 20 and is then transformed in the light receiver 26 into an electric received pulse 102 and is then amplified in the trans-impedance amplifier 46. The received pulse 102 is illustrated in an idealized manner under realistic conditions noise portions and shape distortions would also be present.

The received pulse 102 is always a unipolar signal due to the nature of light. A bipolar signal 104 is made thereof in the filter 48, for example a band pass filter, of which bipolar signal only the first two oscillations are shown. Beside the actual bipolar signal 104 grey squares symbolize a noise level. The bipolar signal 104 is amplified to saturation and cut off in the limiting amplifier 50 so that the actual signal is stretched to a rectangular flank 106 and the noise level illustrated by grey squares is stretched in its amplitude over the overall dynamic range.

The rectangular flank 106 is scanned by the analog-to-digital converter, in particular configured as a binarizer. Each support point of the scanning is symbolized by an arrow 108. The arising bit sequence is used in the evaluation unit 32 in order to form a histogram 110. For this purpose, an accumulator is provided for each bin which only counts up "1" for an associated bit value. For ideal, no noise signals only that bin would be filled in the histogram above which the rectangular flank 106 lies. The noise level increased by the bounding amplifier 50, however, also fills the remaining bin and indeed due to the probability of noise in the expectation value approximately in each second measurement period 100.

If the method described so far is iterated and the histogram 110 is formed over n measurement periods 100 then the bins are filled by the noise approximately with the value n/2, wherein statistical deviations also have to be considered. This value n/2 due to the binarization corresponds to the signal value zero. The maximum formed by the positive part of the bipolar signal 104 is raised therefrom and the corresponding minimum projects downwardly. The zero crossing lying there between is detected by the evaluation unit 32 in order to determine the received point in time independent from the signal level.

Through the statistical evaluation of a plurality of individual measurements the signal-to-noise ratio is increased so far that also for impaired environmental conditions robust distance measurements are possible. This is also true then, when an individually amplified received pulse 102 is so strongly interfered with by noise that no difference between use signal and noise can be recognized.

FIG. 4 only shows a relevant section of the measurement period 100 about the received point in time. In order to save memory this time region can be scanned in advance and the histogram 110 can only be formed for a part of the measurement period 100.

As just explained, individual light pulses are transmitted and are collected and evaluated by the evaluation unit 32 in a histogram 110 during the scanning of the monitoring zone 20 by the laser scanner 10. Through the rotary movement of the deflection unit 18 each individual light pulse obtains an own angular displacement. The multi-pulse method supports an exchange relationship between scanning frequency, angular resolution and range. These are correlated via the statistical depth or averaging depth, this means the number of received pulses 102 which are respectively combined in a histogram 110 for a measurement value. A fourth plausible adjustment screw is provided by the repetition frequency of the individual pulses which are, however, considered to be constant in this example.

The exchangeability of the mentioned parameters will now be explained by means of the FIGS. 5 to 7. FIG. 5a shows a timely intensity extent for low averaging depth, in contrast to this, FIG. 5b shows a timely intensity extent for high averaging depth. A received signal 102b in the near region is in both cases clearly differentiable from the noise level. In contrast to this, in the far region a received pulse 102b can only be separated from noise at the high averaging depth in accordance with FIG. 5b. Thus, the larger the statistical depth the higher is the range of the laser scanner 10.

The FIGS. 6 and 7 respectively show the laser scanner 10 and individual light pulses 54 over a part of the scanning period in a top view. In this connection those individual light pulses 54 are connected by an arrow 56 whose associated received pulses 102 are respectively combined in a histogram 110. However, a very much larger number of, for example, a few hundred or more individual light pulses 54 are transmitted per degree in reality.

FIG. 6 explains the exchangeability of angular resolution and range. In FIG. 6a the individual light pulses 54 are respectively combined to larger groups 56. For this reason objects are still detectable at a relatively large range in accordance with the illustrated association shown in FIG. 5. For this purpose, each group 56 requires a comparatively large angular region. In contrast to this, if a finer angular resolution should be achieved, like in FIG. 6b, then the groups 56 becomes smaller and the reduced averaging depth leads to a worse signal-to-noise ratio and in this way to a reduced range.

A very similar exchangeability is also given for the scanning frequency. FIG. 7a shows a comparison image for a certain scanning frequency. If the scanning frequency is increased then less individual light pulses 54 are incident over the same angular region. One can now either, as shown in FIG. 7b, maintain the angular resolution. Then, the range reduces due to the smaller statistical depth. Alternatively, like in FIG. 7c the range can be maintained, however, the angular resolution then decreases, since for the same statistical depth individual light pulses 54 have to be collected over a larger angular region. Naturally, all intermediate steps are plausible in accordance with this principle for which intermediate step both the range and also the angular resolution can be reduced, however, respectively to a lesser degree.

In an embodiment of the invention it is provided to utilize this exchangeability and to design the range, scanning frequency and angular resolution parameterizable. The user then, for example, specifies one or more of the dimensions and the laser scanner 10 matches the remaining dimensions. Likewise adaptive methods are plausible in which the range and the angular resolution are variable. In this connection a timely dependency is likewise also possible, just like a viewing angle dependency. Then, for example, a certain angular region is detectable at a small range at a high angular resolution, the residual angular region is then detectable at a high range and lesser resolution. A different example is a driverless transport vehicle which initially navigates at a coarse angular resolution and high range in order to then switch into an increasingly improving angular resolution on the detection of an object while the range is only matched to the now known object spacing. This can additionally also take place in dependence on angle.

The multi-pulse method works quasi continuously, since the light transmitter 12 continuously transmits individual light pulses 54, a group 56 of the thereupon registered received pulses 102 is respectively combined and collected in a histogram 110 and the next group 56 is subsequently directly evaluated. In this connection a pause possibly still arises for the evaluation itself.

This quasi-continuous scanning can be used in order to solve the initially explained problem with respect to partial hits. FIG. 8 shows an exemplary test object 58 of the minimum dimensions to be resolved for a common laser scanner having a single pulse method. In order to securely resolve the test object 58 the ratio of the scanning angle to the diameter of the test object 58 must be selected such that a plurality of scanning beams 60 are incident at the test object 58. The test object 58 is then completely hit depending on the arrangement with respect to the angular grid resolved, for example, by 0.5°, like in FIG. 8a only once at the boundary, this, however, completely once, or even, as illustrated in FIG. 8b hit twice completely. Additionally, the spot geometry of the light transmitter 12 is selected, such that the scanning beams 60 overlap and thus gaps in resolution are avoided. In both cases approximately half of the transmission energy is itself not required for a secure detection.

For the statistical multi-pulse method used in accordance with the invention, a plurality of individual pulses is also incident at an object that only has the minimum dimensions. In this connection each received signal is added to the previous received signal in the histogram 110 and following a certain number of individual pulses an evaluation is carried out. As long as only one histogram memory 32a is present the identical problem is present like in accordance with FIG. 8 for this reason. It must be ensured that a sufficient number of individual pulses are incident at the minimum test object 58 and therefore enter into the associated histogram 110 for a secure detection.

A complete histogram 118 based on a respective measurement value can for this reason be considered analog to a scanning beam 60. Thus, the histograms 110 recorded subsequently displaced by a corresponding angle with respect to one another provide the same angular resolution as for a single pulse method when, for example, a new histogram is recorded every 0.5°. Histograms 110 in which only a part of the transmitted individual pulses are incident at the test object 58 possibly do not achieve a securely evaluable signal-to-noise ratio and for this reason such part hits are discarded for a corresponding remission. Moreover, it is not possible to overlap subsequent histograms 110 in only one histogram 32 for a gap-free covering as long as one can achieve in the single pulse method by larger beam cross-sections of the scanning beam 60.

In addition to this, a certain blind time for the evaluation itself arises. FIG. 9 schematically shows a timely extent in this connection in which the histogram is alternatingly recorded and evaluated. During the evaluation the histogram must remain stable so that no received signals can be considered in the meantime.

It thereby becomes clear that at least two histograms 110 separated by a dead time have to be placed at a test object 58 in order to securely detect it. For a predefined fixed rotary speed and pulse repetition frequency of the laser scanner 10 this limits the statistical depth of the histograms 110: the time in which the laser scanner 10 covers the test object 58 must be sufficient for the recording and evaluation of at least two subsequently following histograms 110. Accordingly, less than half of the energy incident at the test object 58 can be used for the distance determination. The energetic loss is not improved with respect to a common single pulse method.

For this reason, instead of only one histogram memory, two or more histogram memories 32a, 32b are implemented which accumulate the received signals shifted in time. Thereby, the possibility is created to utilize the maximum statistical depth. In other words, the number of received signals in a histogram 110 can be selected such that it corresponds approximately to the dimensions of the smallest object to be detected. In such a histogram 110 nearly the overall energy remitted by the object is included and thus a distance value can be determined with ideal accuracy.

Received signals from one and the same transmitted individual pulse are thus processed in two or more histograms 110. The evaluation unit 32 alternatively the logic module at which it is implemented must also provide the required extended logic beside the memory space for the histogram memory 32a, 32b.

In analogy to FIG. 9, FIG. 10 shows the timely extent on use of two histogram memories 32a, 32b. While histogram 1 is still being collected in the histogram memory 32a the recording of overlapping histogram 2 starts in the other histogram memory 32b. Following a respective evaluation time window measurement values are then available with a total of double frequency and/or angular resolution. As an example for number values a respective recording and evaluation of both histograms takes place over 0.25°, 0.5°, 1° or more, during which a few ten, hundred or more received signals are collected in each histogram.

The time made available for the recording of an individual histogram is significantly increased by the additional histogram memory 32b. Despite the larger statistical depth of each individual measurement value more measurement values are made available per angular section thus the angular resolution is increased.

In order to further increase the statistical depth and/or the number of the measurement values also more than two histograms can be recorded shifted in time in additional histogram memories. FIG. 11 shows an example with five histogram memories. In this respect the number and timely sequence is ideal, since the evaluation time windows directly merge into one another such that the logic of the evaluation unit 32 is ideally used. Real dead times are not present since at any time one or even any plurality of histograms 110 are active in order to collect received signals. The detected remitted energy is maximized and the geometrical resolution is considerably refined.

In accordance with the above explained exchange relationships, instead of an increase of the geometric resolution, the leeway can also be used for the purpose of reducing the pulse frequency in order to satisfy eye protective conditions or in order to improve the signal reserve and thus the range and/or the capability for the detection of weakly remitting targets.

In FIG. 11 specifically the boundary case is shown where a plurality of histograms 110 can be evaluated with only a serial evaluation. It is also plausible to extend the plurality of histogram memories 32a, 32b to completely independent evaluation channels. In this way, also measurement paths can be recorded in a histogram 110 whose evaluation requires more time than the time shift between two histograms. Plastically referred to with respect to FIG. 11 this means that the histograms are pushed closer to one another and the evaluation intervals can be increased, since also their overlap is possible by means of a parallel evaluation in a plurality of these evaluation channels. The evaluation channels can, but do not necessarily, have to be associated uniquely with a histogram memory 32a, 32b.

A plurality of evaluation channels 32a-b can additionally or alternatively also be used to subject the same measurement data in the form of the received pulses 102 to a plurality of parallel different evaluations. With respect to redundant or diversely redundant evaluations this serves for the purpose of a check of the reliability of the evaluation. However, different further criteria on the range and angular resolution can be applied also in the parallel branches. Thus, for example, a measurement with a high range and low angular resolution and a measurement with low range and high angular resolution can simultaneously be carried out and later the required measurement is selected or measurements are compared amongst one another or calculated with one another.

The mutual shift of the histograms in a certain manner is like a sliding average in which angular scales displaced with respect to one another are scanned and are placed on top of one another for an improved angular resolution. In contrast to a sliding average, however, no memory has to be made available for the individual measurements in order to remove respective received signals 102 for an increasing scan movement from the histograms 110, since one histogram 110 is respectively collected, evaluated and then discarded per histogram memory 32a, 32b.

It is however also plausible to realize such a "floating histogram". Such a histogram is not re-started after each measurement value, but rather the respectively oldest received signal is removed from the histogram and the current received signal is added. In this way a completely filled histogram is made available in principle after each transmitted individual pulse. In this way the transmitted individual pulse can deliver an own measurement value. Practically, one would not generally evaluate so frequently, but rather only after a respective plurality of individual pulses, since the basis of information through the exchange of only one received signal would be too similar and the requirements on the calculation capacities are too high.

FIG. 12 shows a "floating" histogram. In FIG. 12a the first five received signals are collected in a histogram. The measurement information is included only in the amplitude, this means the number of events (counts) per measurement section (bin). However, the individual contributions are characterized by a pattern in order to obtain the association with the received signal. This additional information in the form of an association date or time stamp is required in order to remove the respectively oldest received signal from the histogram.

Figure 12A:
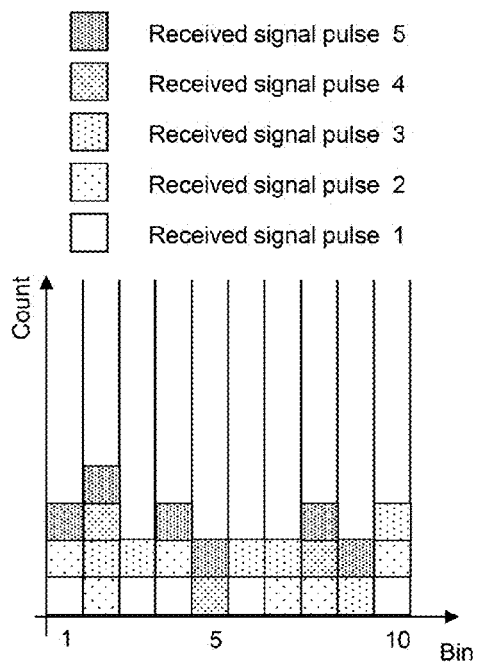
Figure 12B:
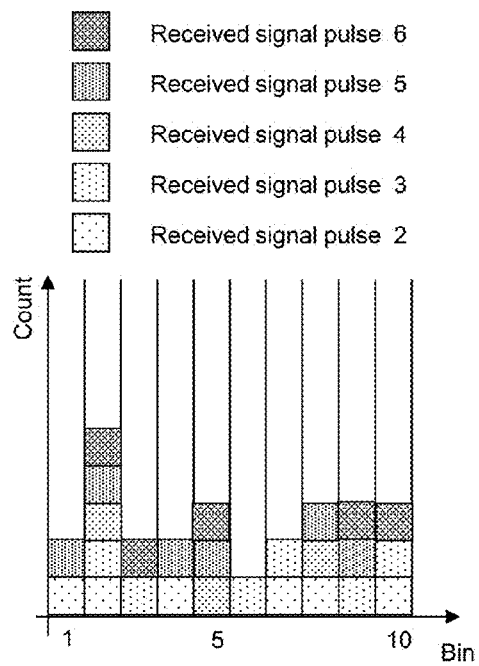
Figure 12C:
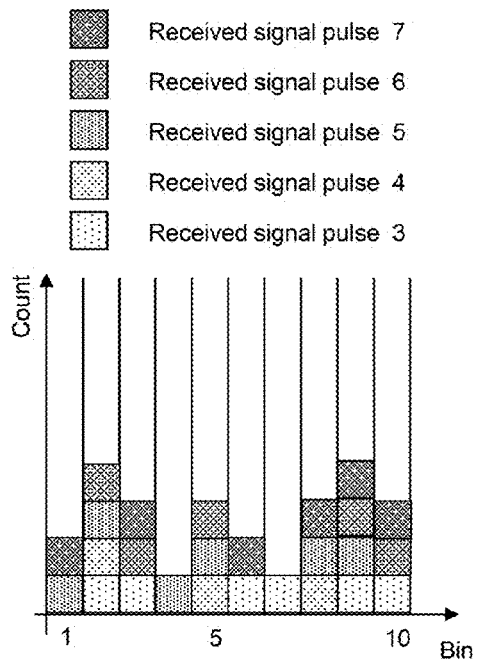
Figure 12D:
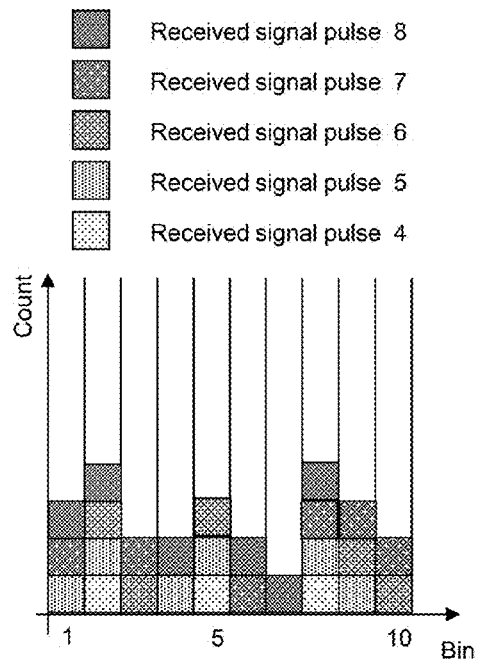

FIG. 12b shows the histogram once the events with respect to the oldest received signal to pulse 1 are removed the counts lying there above have been slid downwardly and the events of the current received signal with respect to pulse 6 have been refilled from above. Thus, a new current histogram is rapidly obtained. The FIGS. 12c and 12d also show two analogous subsequent steps in which the received signal with respect to pulse 2 is replaced by the received signal with respect to pulse 7 and/or the received signal with respect to pulse 3 was replaced by the received signal with respect to pulse 8.

For detecting a secure measurement value generally histograms with a certain statistical depth are required. On the other hand, however, also histograms on the basis of only a few received signals frequently already include a usable albeit non-secure measurement information. FIG. 13 shows a schematic illustration with respect to a further embodiment which makes this measurement information useable. The illustration uses significantly too large angles for a better overview with respect to the practical application.

The histograms H1 . . . H6 schematically illustrated above their associated angular region in FIG. 13 are evaluated with a relatively low statistical depth such that, for example, already with a 0.1° angular resolution non-secure measurement values are available. In this way also objects are resolved which are smaller than the required minimum dimensions of 30 mm, 50 mm or 70 mm required by the safety technology, or an environmental map for the navigation of a driverless transport system is generated with a finer point grid. The requirement is that sufficient energy of the transmitted individual pulses is remitted. The most real objects are, however, brighter than the remission of only 2% required by the safety norm. Thus, as long as no secure detection is required in this sense also measurement values can be provided with high angular resolution, or such measurement values are output in addition to the secure measurement values.

In order to still also ensure the safe secure detection, the histograms H1 . . . H6 are not only then evaluated individually but rather combined up until such a collected histogram has the required statistical depth in order to, for example, also recognize the dark checking rod on the removal of a safety laser scanner.

This combining can take place differently depending on the number of the histogram memories present. If sufficient histogram memory is available the individual histograms H1 . . . H6 are then rollingly evaluated, for example, H1+H2+ H3+H4 for the first secure measurement value, H2+H3+H4+ H5 for the second secure measurement value and so on. Then the output of secure measurement values can take place just as frequently as the output of non-secure measurement values. However, also only one histogram memory for the non-secure measurement values and a respective further histogram memory per overlappingly evaluable secure measurement value is sufficient. A respective individual histogram H1 . . . H6 is then added to these histogram memories and subsequently discarded.

For the embodiment explained with reference to FIG. 13 it is possible to specify two different angular resolutions, for example, 0.1° for the non-secure measurement value and 0.5° for the secure measurement value.

By means of the so far described embodiments a gap-free scanning system is in principle assembled which shows no scanning gap at any scan angle. Depending on the requirements of use the laser scanner 10 is, however, subjected to a more or less large deviation in angular number of rotations, for example, by shocks and jolts. It can then happen that already the evaluation for a new measurement value must start with a new histogram 110 before the current measurement is terminated. This consideration is true for each histogram memory, since for a secure application it is not necessarily sufficient when the deviation of the number of rotations is intercepted solely by a different histogram memory.

FIG. 14 illustrates the situation. FIG. 14a shows an ideal case without deviations of number of rotations. The angular measurement unit 30 provides uniform, equidistant angular position signals 62, and the individual light pulses 54 and/or their associated received pulses 102 are combined without overlap in groups 56. The arrows 64 refer to the dead time interval which is required for the evaluation of the histogram 110. In FIG. 14b the behavior in time becomes confused due to a deviation of number of rotations. The group 56a at 4° still collects individual light pulses 54, which actually already belong to the group 56b at 5°.

A possible cause for such erroneous associations lies in too low a physical resolution of the angular measurement unit 30, for example, on use of a line disc. The angular position signal for the desired angular resolution must then be interpolated and are not available in real time.

In this way it only subsequently becomes clear that received signals 102 were erroneously still collected in the early histogram 110. A simple way out consists therein to delay the evaluation, this means to initially intermediately store all received signals 102 as such and to only group and statistically evaluate these subsequently. However, an additional memory demand arises thereby and the real time measurement capability is lost. A different way out would be to discard the measurement value when it is found that the histogram 110 already includes received pulses 102 of the subsequent angular region. However, scanning gaps then arise in this connection.

For this reason a dynamic matching of the statistical depth is provided in an embodiment in accordance with the invention. In a very simple implementation each group is terminated when a new angular position signal 62 is incident, independent of the thereby achieved statistical depth. In accordance with the above explained exchange relationship finally a range deviation results here from in dependence on the angle which, however, frequently is more acceptable than a scanning gap.

Generally, one would, however, only want to predefine a range and thus a statistical depth. In other words the number of the individual light pulses 54 and thus the associated received pulses 102 per group 56 is defined in advance. This provision can, as already explained above, by all means be dynamical, this means vary with the angular range or with time.

In order to match the deviations of number of rotations a reserve buffer is then switched upstream in a further embodiment. An increased region, like the dead zone 64, is maintained between each group 56 in which dead zone 64 in the ideal case of FIG. 14a no received pulses 102 are added to the histogram 110. If a deviation of number of rotations then appears then the reserve buffer is used in order to obtain the predefined number of received pulses 102 already before the next angular position signal 62. In this way, the method moves further away from the quasi-continuous evaluation, the larger the reserve buffer is selected.

FIG. 15 shows a further embodiment of the invention which can be used in order to avoid the reserve buffer; and/or in order to make preparations for the case that the reserve buffer is not sufficient in order to catch deviations of number of rotations. As already shown in FIG. 14, the timely sequence of the individual light pulse 54 is shown in the upper part of the FIG. 15. Beneath that the angular signals 62a generated by the angular measurement unit 30 are illustrated from which the angular position signals 62 having the desired angular resolution can be derived by interpolation. Alternatively, the angular measurement unit 30 can directly deliver a desired angular grid with angular position signals 62.

It is uncritical when a time span 66 for collecting a predefined number of received pulses 102 including the dead time 64 for the evaluation is smaller than the time interval between two angular position signals 62. Then a measurement value is generated and one waits for the next angular position signal at the next measurement value.

Illustrated in FIG. 15 is, however, the case in which the time interval between two angular position signals 62 is not sufficient due to a deviation of number of rotations in order to therein collect the required number of received pulses 102 in a histogram 110. Then, the next measurement is immediately started directly after a measurement. This cannot prevent the timely running apart, however, reduces this at least. The start of any measurement is illustrated by arrows 68. A measurement value is then subsequently associated with that angular segment in which the majority, in particular more than 50% of the individual light pulses 54 and/or the associated received pulses 102 lie. This is shown by further arrows 70. Thus, not only the measurement value, but also the associated angle has to be transferred as an output value in this example.

If a plurality of shortened angular segments follow one another then angular position signals 62 can arise which do not initiate a new measurement, since the previous measurement still consumes the entire available time budget. This is the case in the example of FIG. 8 at 5° and at 11°. For these angular position signals 62 initially no measurement values are available. The measurement values can, however, if required, be interpolated from the neighboring angular position signals 62. The continuous and gap-free monitoring remains ensured, since individual light pulses 54 have been drawn upon for each intermediate angle in the measurement.

In this connection, a quasi-continuous scanning has in any way taken place with respect to the real illumination by means of the transmission light beam 16. The pulse sequence of the individual pulses 54 with respect to the angle of rotation was, however, applied slower due to the sudden increase of the number of rotations than would be required so that effectively the angular resolution reduces temporarily.

The most precise evaluation specified from a measurement point of view consists therein in using additional histogram memories 32a-b and/or evaluation channels also for the catching of such deviations of the number of rotations. It should be noted that this requires more histogram memory than the above considered shifted collection of histograms, since the deviation of number of rotations is an additional effect which can also confuse the reference in time of the shifted histogram recording. In order to balance out the deviations in number of rotations an evaluation channel, if required, continues its histogram generation also for a further angular position signal 62 while overlappingly an additional evaluation channel already starts a further measurement with the further angular position signal 62 as a start signal. The statistical depth and thus the range and the angular resolution then completely remain untouched from deviations of the number of rotations. Merely, the independence of the measurement values is slightly influenced, since received pulses 102 in the overlapping region contribute twice in the earlier and the latter measurement values after the further angular position signal 58. However, this has no practical effects, since still all received pulses 102 stem from real measurements at the associated angle of detection.

As a starting state of the histogram 110 it was so far at least implicitly assumed in the so far described embodiments that all bins are empty. One can also specifically deviate from this and the histogram 110 can be pre-loaded with expectation values. In this connection, both angle-independent and also angle-dependent expectation values are plausible.

An application consists in a suppression of a front screen reflex which the transmission light beam 16 generates on exit from the laser scanner 10 through the front disc 38. In an analog manner, however, also other interfering influences, such as an optical or electric crosstalk can be compensated. Finally, in principle, precisely for statistical applications, it is also plausible to teach a reference scenario by expectation values in order to then react particularly fast and sensitively on movements or additional objects during operation.

For this purpose, these interferences are taught in calibration measurements with the later angular resolution in the factory or at the place of use and in this connection measured expectation values are subsequently preloaded with negative sign on the forming of each new histogram in its bin. In this connection a scaling by means of the statistical depth used on teaching and/or during operation takes place. Advantageously the expectation values are already taught with the latter statistical depth, however, this is not always possible due to the adaptive elements of the invention.

When now the received pulse 102 is collected in the so pre-stored histogram 110, then the taught known interferences are automatically compensated at a very early time in the measurement path due to the expectation values.

Although the invention is described by means of Figures and embodiments it also comprises the possibility of combining these.

What is claimed is:

1. A laser scanner (10) for the detection and determination of distances of objects in a monitoring zone (20), comprising:
    a light transmitter (12) for the transmission of a transmission light beam (16) having a plurality of consecutive individual light pulses;
    a rotatable deflection unit (18) for the periodic deflection of the transmission light beam (16) into the monitoring zone (20);
    an angular measurement unit (30) for the generation of angular position signals (62) in dependence on an angular position of the deflection unit (18);
    a light receiver (26) for the generation of received signals from the transmission light (22) remitted or reflected from objects in the monitoring zone (20);
    at least two histogram memories (32a, 32b) each having a plurality of memory spaces in which respectively a section of a received signal can be accumulated, the two histogram memories collecting a series of first and second histograms; and
    an evaluation unit (32) which is configured to identify a received pulse associated with an object in one of said histograms (110) taken from at least one of the histogram memories (32a, 32b) and therefrom to determine the distance of the object by means of a light propagation method, wherein the histogram (110) is collected over a time interval which is associated with an angular position signal (62),
    wherein the at least two histogram memories (32a, 32b) collect at least a first histogram in the series of histograms and a second histogram in the series of histograms in overlapping time intervals, thus providing an overlapping of the histograms within the first or second series in shifted evaluation intervals.

2. The laser scanner (10) in accordance with claim 1, wherein the evaluation unit (32) uses a timed spacing between light pulses for a determination and output of positional object spacings in real time.

3. The laser scanner (10) in accordance with claim 1, wherein the rotation of the deflection unit (18) is divided into angular sections (62) predefined by an angular resolution of the laser scanner (10), and wherein a first time window for collecting a histogram and a consecutive second time window for evaluating the histogram are provided in the evaluation unit (32) for each angular section (62).

4. The laser scanner (10) in accordance with claim 1, wherein the evaluation unit (32) has at least two evaluation channels for evaluation of a sequence of histograms from one of the histogram memories.

5. The laser scanner (10) in accordance with claim 1, wherein the histogram memory (32a, 32b) is configured to store a time stamp for the received signals from the transmission light and to respectively delete the oldest received signal in a rolling manner on the addition of a further received signal from the transmission light.

6. The laser scanner (10) in accordance with claim 1, wherein the evaluation unit (32) combines the histograms (110) of said at least two histogram memories (32a, 32b) in one of said histogram memories (32a, 32b).

7. The laser scanner (10) in accordance with claim 1, further comprising at least one analog-to-digital converter (52) in order to digitize received signals for accumulation in the at least two histogram memories (32a, 32b).

8. The laser scanner (10) in accordance with claim 7, wherein the analog-to-digital converter (52) is a binarizer and the memory spaces are configured as counters.

9. The laser scanner (10) in accordance with claim 1, wherein the at least two histogram memories (32a, 32b), the evaluation unit (32) and the analog-to-digital converter (52) are implemented on a common digital logic module (38).

10. The laser scanner (10) in accordance with claim 9, wherein the digital logic module is an FPGA.

11. The laser scanner (10) in accordance with claim 1, further comprising an analog preprocessor (44) which has a filter (48) in order to respectively transform a received pulse (102) to a bipolar preprocessed signal (104) and to supply this to the evaluation unit (32) via an analog-to-digital converter (52).

12. The laser scanner (10) in accordance with claim 11, wherein the analog preprocessor (44) has a limiting amplifier (50) for amplifying a positive and/or negative portion of the signal (104) to a saturation value and the analog-to-digital converter (52) is a binarizer.

13. A laser scanner (10) in accordance with claim 1, which is configured as a safety scanner having a secure output (34), wherein the evaluation unit (32) is configured to recognize unallowed entries in protective fields within the monitoring zone (20) and thereupon to output a safety directed turn off signal at the secure output (34).

14. A method for the detection and determination of distances of objects in a monitoring zone (20), comprising the steps of
using a light transmitter to transmit a transmission light beam (16) having a plurality of consecutive individual pulses;
using a scanner to scan the monitoring zone (20) with the transmission light beam (16) by periodic deflection, with the angle of the scanning being determined by an angular position signal (62);
using a light receiver to generate received signals from transmission light (22) remitted or reflected from objects in the monitoring zone (20);
using a processor to:
accumulate a respective section of a received signal in first and second histogram memories (32a, 32b) having a plurality of memory spaces, the two histogram memories collecting a series of first and second histograms;
identify a received pulse associated with an object in a one of said histograms (110) taken from the histogram memory (32a, 32b); and
determine therefrom the distance of the object by means of a light propagation method;
collect the histogram (110) in the series of the histograms over a time interval which is associated with an angular position signal (62); and
collect a first histogram in the series of histograms and a second histogram in the series of histograms in overlapping time intervals in the first histogram memory (32a) and the second histogram memory (32b), thus providing an overlapping of the histograms in shifted evaluation intervals.

15. The method in accordance with claim 14,
further comprising the steps of
dividing the periodic scanning into angular sections (62) provided by an angular resolution;
collecting a histogram (110) in each angular section (62) in a first time window; and
evaluating the histogram (110) in a second consecutive time window.

16. The method in accordance with claim 14,
further comprising the step of
evaluating a plurality of sequential histograms (110) in at least two evaluation channels.

17. The method in accordance with claim 14,
further comprising the steps of
storing a time stamp for the received signals from the transmission light; and
respectively deleting the oldest received signal in a rolling manner on addition of a further received signal from the transmission light.

18. The method in accordance with claim 14,
further comprising the steps of
initially collecting histograms in the first and second histogram memories (32a, 32b); and
then combining the histograms in the first and second histogram memories (32a, 32b) in one of said histogram memories (32a, 32b).

* * * * *